United States Patent
Park et al.

(10) Patent No.: US 9,066,265 B2
(45) Date of Patent: Jun. 23, 2015

(54) METHODS AND ARRANGEMENTS FOR FREQUENCY SELECTIVE TRANSMISSION

(71) Applicants: Minyoung Park, Portland, OR (US); Eldad Perahia, Portland, OR (US); Thomas J. Kenney, Portland, OR (US); Shahrnaz Azizi, Cupertino, CA (US)

(72) Inventors: Minyoung Park, Portland, OR (US); Eldad Perahia, Portland, OR (US); Thomas J. Kenney, Portland, OR (US); Shahrnaz Azizi, Cupertino, CA (US)

(73) Assignee: Intel Corporation, Santa Clara, CA (US)

( * ) Notice: Subject to any disclaimer, the term of this patent is extended or adjusted under 35 U.S.C. 154(b) by 36 days.

(21) Appl. No.: 13/731,001

(22) Filed: Dec. 29, 2012

(65) Prior Publication Data

US 2014/0112246 A1    Apr. 24, 2014

Related U.S. Application Data

(60) Provisional application No. 61/716,481, filed on Oct. 19, 2012.

(51) Int. Cl.
    *H04W 4/00*      (2009.01)
    *H04W 28/16*      (2009.01)
    *H04W 74/00*      (2009.01)

(52) U.S. Cl.
    CPC ............ *H04W 28/16* (2013.01); *H04W 74/002* (2013.01)

(58) Field of Classification Search
    CPC ...................................................... H04W 28/16

USPC .......................................................... 370/328
See application file for complete search history.

(56) References Cited

U.S. PATENT DOCUMENTS

| | | | |
|---|---|---|---|
| 6,791,995 B1* | 9/2004 | Azenkot et al. | 370/436 |
| 2007/0253476 A1 | 11/2007 | Tirkkonen et al. | |
| 2010/0091731 A1 | 4/2010 | Kim et al. | |
| 2011/0075759 A1 | 3/2011 | Seok | |
| 2011/0096738 A1 | 4/2011 | Choi | |
| 2012/0263090 A1* | 10/2012 | Porat et al. | 370/312 |
| 2013/0058239 A1* | 3/2013 | Wang et al. | 370/252 |

OTHER PUBLICATIONS

International Search Report and Written Opinion received for PCT Patent Application No. PCT/US2013/048829, mailed on Oct. 21, 2013, 11 pages.

* cited by examiner

*Primary Examiner* — Wei Zhao
(74) *Attorney, Agent, or Firm* — Schubert Law Group PLLC

(57) ABSTRACT

Logic such as hardware and/or code to narrow available sub-channels in frequency selective transmission communications in which a station selects a narrow band from a wider channel bandwidth. A frequency selective transmission scheme for communications devices may select a 1 or 2 MHz channel from a wider channel bandwidth (e.g., 4, 8, 16 MHz) that consists of a number of 1 or 2 MHz sub-channels and transmitting packets on the selected sub-channel. The access point may narrow the number of sub-channels available for selection by stations. Stations may narrow the number of sub-channels. Both the AP and the stations may operate to narrow the number of sub-channels. A medium access control sub-layer protocol common to the communications devices may facilitate a frequency selective transmission scheme.

34 Claims, 5 Drawing Sheets

METHODS AND ARRANGEMENTS FOR FREQUENCY SELECTIVE TRANSMISSION

BACKGROUND

The present disclosure relates generally to the field of wireless communications technologies. More particularly, the present disclosure relates to narrowing available sub-channels in frequency selective transmission communications.

DETAILED DESCRIPTION OF EMBODIMENTS

Figure 1:
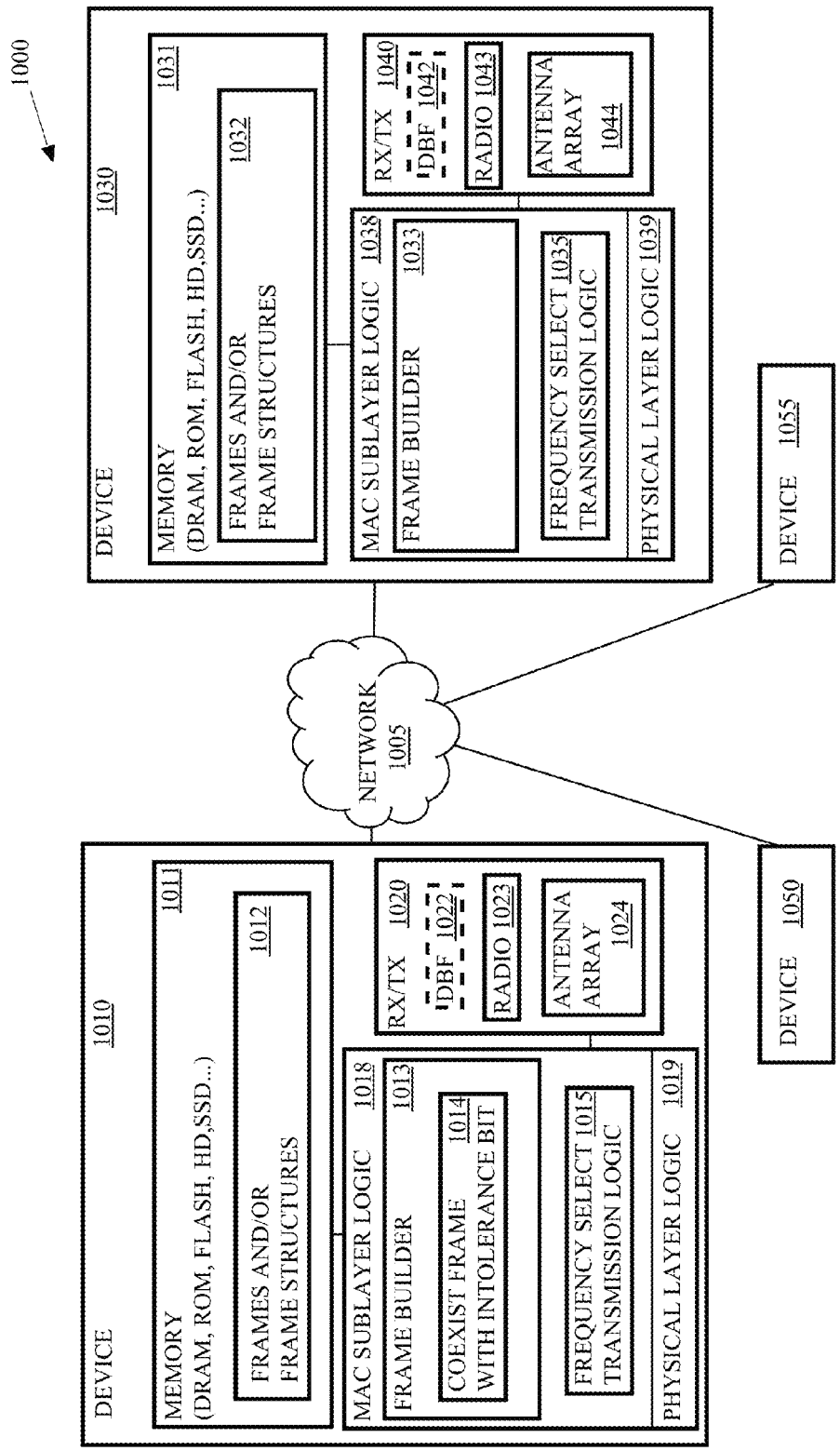
FIG. 1 depicts an embodiment of a wireless network comprising a plurality of communications devices, including multiple fixed or mobile communications devices.

The following is a detailed description of novel embodiments depicted in the accompanying drawings. However, the amount of detail offered is not intended to limit anticipated variations of the described embodiments; on the contrary, the claims and detailed description are to cover all modifications, equivalents, and alternatives as defined by the appended claims. The detailed descriptions below are designed to make such embodiments understandable and obvious to a person having ordinary skill in the art.

Generally, embodiments for frequency selective transmission communications are described herein. Embodiments may comprise logic such as hardware and/or code to narrowing available sub-channels in frequency selective transmission communications in which a station selects a narrow band from a wider channel bandwidth. In some embodiments, a frequency selective transmission scheme for communications devices may select a 1 or 2 MHz channel from a wider channel bandwidth (e.g., 4, 8, 16 MHz) that consists of a number of 1 or 2 MHz sub-channels and transmitting packets on the selected sub-channel. In several embodiments, the access point may narrow the number of sub-channels available for selection by stations. For instance, the AP may scan the sub-channels prior to transmission of sounding frames and only send the sounding frames on sub-channels that are idle. In several embodiments, the stations associated with the AP may only transmit on the sub-channels on which the stations received a sounding frame.

In other embodiments, the stations may narrow the number of sub-channels. In such embodiments, the stations associated with an AP may periodically scan the sub-channels. In some of these embodiments, the stations may periodically scan sub-channels on which the station successfully received sounding packets. In several embodiments, stations that identify a busy sub-channel may remain off the sub-channel for a duration of time such as 30 minutes. In some embodiments, the stations may receive a management frame such as a beacon frame from another AP that includes an intolerance bit indicating not to use a sub-channel for a duration of time. And, in many embodiments, the stations may transmit a report to their AP indicating collected information on sub-channels so the AP may determine which sub-channels to use.

In several embodiments, the stations may scan sub-channels to provide reports to the AP and the AP may scan the sub-channels and only send sounding packets on the idle sub-channels. In further embodiments, the station may receive an intolerance bit from an Overlapping Basic Service Set (OBSS) STA indicating, e.g., a particular sub-channel to avoid, and the station may communicate information from the intolerance bit to the AP such as including an intolerance bit in a coexistence frame.

In further embodiments, both the AP and the stations operate to narrow the number of sub-channels. In many embodiments, a medium access control sub-layer protocol common to the communications devices may facilitate a frequency selective transmission scheme with a sub-channel narrowing feature that selects a subset of the sub-channels as viable candidates for communications between a station and the access point.

Various embodiments may be designed to address different technical problems associated with improving narrow channel bandwidth communications. For instance, some embodiments may be designed to address one or more technical problems such as narrowing the increased number of sub-channels with narrow channel bandwidths. The technical problem of coordinating the selection of a subset of sub-channels with narrow channel bandwidths.

Different technical problems such as those discussed above may be addressed by one or more different embodiments. For instance, some embodiments narrow the increased number of sub-channels with narrow channel bandwidths may do so by one or more different technical means such as scanning or sensing each sub-channel prior to the AP transmitting a sounding packet. Further embodiments that are designed to coordinate the selection of a subset of sub-channels with narrow channel bandwidths may do so by one or more different technical means such as limiting the selection of sub-channels by stations to sub-channels on which the stations successfully receive a sounding packet, eliminating sub-channels from the subset of sub-channels if an intolerance bit is received that indicates that the sub-channel should not be used, monitoring by the station the traffic load and channel condition so that high traffic load and/or poor channel condition sub-channels are not included in the sub-set of sub-channels, eliminating sub-channels that are busy for a time duration, and/or the like.

Some embodiments implement a one Megahertz (MHz) channel bandwidth for Institute of Electrical and Electronic Engineers (IEEE) 802.11ah systems. The lowest data rate in such embodiments may be approximately 6.5 Megabits per second (Mbps) divided by 20=325 Kilobits per second (Kbps). If two times repetition coding is used, the lowest data rate drops to 162.5 Kbps. Many embodiments may enable small battery-powered wireless devices (e.g., sensors) to use Wi-Fi to connect to the, e.g., Internet with very low power consumption.

Some embodiments may take advantage of Wireless Fidelity (Wi-Fi) network ubiquity, enabling new applications that often require very low power consumption, among other unique characteristics. Wi-Fi generally refers to devices that implement the IEEE 802.11-2007, IEEE Standard for Information technology—Telecommunications and information exchange between systems—Local and metropolitan area networks—Specific requirements—Part 11: Wireless LAN Medium Access Control (MAC) and Physical Layer (PHY) Specifications (http://standards.ieee.org/getieee802/download/802.11-2007.pdf) and other related wireless standards.

Several embodiments comprise access points (APs) for and/or client devices of APs or stations (STAs) such as routers, switches, servers, workstations, netbooks, mobile devices (Laptop, Smart Phone, Tablet, and the like), as well as sensors, meters, controls, instruments, monitors, appliances, and the like. Some embodiments may provide, e.g., indoor and/or outdoor "smart" grid and sensor services. For example, some embodiments may provide a metering station to collect data from sensors that meter the usage of electricity, water, gas, and/or other utilities for a home or homes within a particular area and wirelessly transmit the usage of these services to a meter substation. Further embodiments may collect data from sensors for home healthcare, clinics, or hospitals for monitoring healthcare related events and vital signs for patients such as fall detection, pill bottle monitoring, weight monitoring, sleep apnea, blood sugar levels, heart rhythms, and the like. Embodiments designed for such services generally require much lower data rates and much lower (ultra low) power consumption than devices provided in IEEE 802.11n/ac systems.

Logic, modules, devices, and interfaces herein described may perform functions that may be implemented in hardware and/or code. Hardware and/or code may comprise software, firmware, microcode, processors, state machines, chipsets, or combinations thereof designed to accomplish the functionality.

Embodiments may facilitate wireless communications. Some embodiments may comprise low power wireless communications like Bluetooth®, wireless local area networks (WLANs), wireless metropolitan area networks (WMANs), wireless personal area networks (WPAN), cellular networks, communications in networks, messaging systems, and smart-devices to facilitate interaction between such devices. Furthermore, some wireless embodiments may incorporate a single antenna while other embodiments may employ multiple antennas. The one or more antennas may couple with a processor and a radio to transmit and/or receive radio waves. For instance, multiple-input and multiple-output (MIMO) is the use of radio channels carrying signals via multiple antennas at both the transmitter and receiver to improve communication performance.

While some of the specific embodiments described below will reference the embodiments with specific configurations, those of skill in the art will realize that embodiments of the present disclosure may advantageously be implemented with other configurations with similar issues or problems.

Turning now to FIG. 1, there is shown an embodiment of a wireless communication system 1000. The wireless communication system 1000 comprises a communications device 1010 that may be wire line and wirelessly connected to a network 1005. The communications device 1010 may communicate wirelessly with a plurality of communication devices 1030, 1050, and 1055 via the network 1005. The communications device 1010 may comprise an access point. The communications device 1030 may comprise a low power communications device such as a sensor, a consumer electronics device, a personal mobile device, or the like. And communications devices 1050 and 1055 may comprise sensors, stations, access points, hubs, switches, routers, computers, laptops, netbooks, cellular phones, smart phones, PDAs (Personal Digital Assistants), or other wireless-capable devices. Thus, communications devices may be mobile or fixed. For example, the communications device 1010 may comprise a metering substation for water consumption within a neighborhood of homes. Each of the homes within the neighborhood may comprise a sensor such as the communications device 1030 and the communications device 1030 may be integrated with or coupled to a water meter usage meter.

The communications devices 1010, 1030, 1050, and 1055 may be capable of one or more frequency selective transmission schemes or communications via frequency selective transmission logic such as frequency selective transmission logic 1015 and 1035, and the frequency selective transmission logic 1015 of communications device 1010 may select one or more frequency selective transmission protocols based upon capabilities determined about the communications devices 1030, 1050, and 1055 during association with the access point.

Initially, for example, the communications devices 1030, 1050, and 1055 may receive a beacon from communications device 1010 assigning time slots to the communications devices 1030, 1050, and 1055. The frequency selective transmission logic 1015 of the communications device 1010 may also allocate a time slot for sounding. The frequency selective transmission logic of the communications device 1010 may transmit the sounding packets over all sub-channels of a wide channel bandwidth. For instance, a 4 MegaHertz (MHz) channel bandwidth may have two 2 MHz sub-channels or four 1 MHz sub-channels. A 16 MHz channel bandwidth may comprise eight 2 MHz sub-channels, four 4 MHz sub-channels, or sixteen 1 MHz sub-channels.

The frequency selective transmission logic of communications devices 1030, 1050, and 1055 may receive the sounding packets during the sounding period and the frequency selective transmission logic each of the communications devices 1030, 1050, and 1055 may select a sub-channel for communications with communications device 1010. In some embodiments, a station (STA) such as communications device 1030 may transmit a narrow band packet only on a sub-channel it received a sounding packet. In such embodiments, the communications device 1010 (the AP) senses each sub-channel and sends sounding packets only on sub-channels (e.g., each 1 or 2 MHz) that are idle.

In further embodiments, the frequency selective transmission logic 1015 of the communications device 1010 may exclude the primary channel from transmission of a sounding packet. In such embodiments, the beacon or other frames may be sufficient for stations to estimate the channel condition of the primary channel to estimate the channel condition of the primary channel. While the illustrated examples of the primary channel is the lowest frequency, 1 or 2 MHz sub-channel, other embodiments may utilize higher frequency sub-channels. In further embodiments, the sub-channels may not be just 1 or 2 MHz but may include larger bandwidths and/or fractional bandwidths.

For embodiments in which the communications device 1010 does not transmit sounding packet on every sub-channel, the frequency selective transmission logic 1015 of the communications device 1010 may schedule, in the beacon transmissions or other management frame transmissions, each sounding packet so that stations can determine when to move to the next sub-channel. In other words, based upon the schedule, the stations will not wait for an indefinite time on a sub-channel on which the communications device 1010 has determined not to transmit a sounding packet. For example, the frequency selective transmission logic 1015 may receive one or more reports from one or more stations within the communications device's 1010 basic service set (BSS). The reports may include information about the sub-channels that has been collected by the stations and the frequency select transmission logic 1015 may determine from the information that the communications device 1010 will not transmit sounding packets on one or more of the sub-channels.

The stations such as communications devices 1030, 1050, and 1055 may wait for the sounding packets during the sounding period. In many embodiments, each station selects a sub-channel only from the sub-channels on which the station receives the sounding packets successfully. In several embodiments, a station such as the communications device 1030 may comprise frequency select transmission logic 1035 to select a sub-channel based upon, e.g., the channel condition (e.g., the signal strength), activity on the sub-channel (e.g., the traffic load of the sub-channel), and/or other factors. In some embodiments, the frequency select transmission logic 1035 may avoid a sub-channel that has low signal strength or heavy traffic.

Figure 1A:
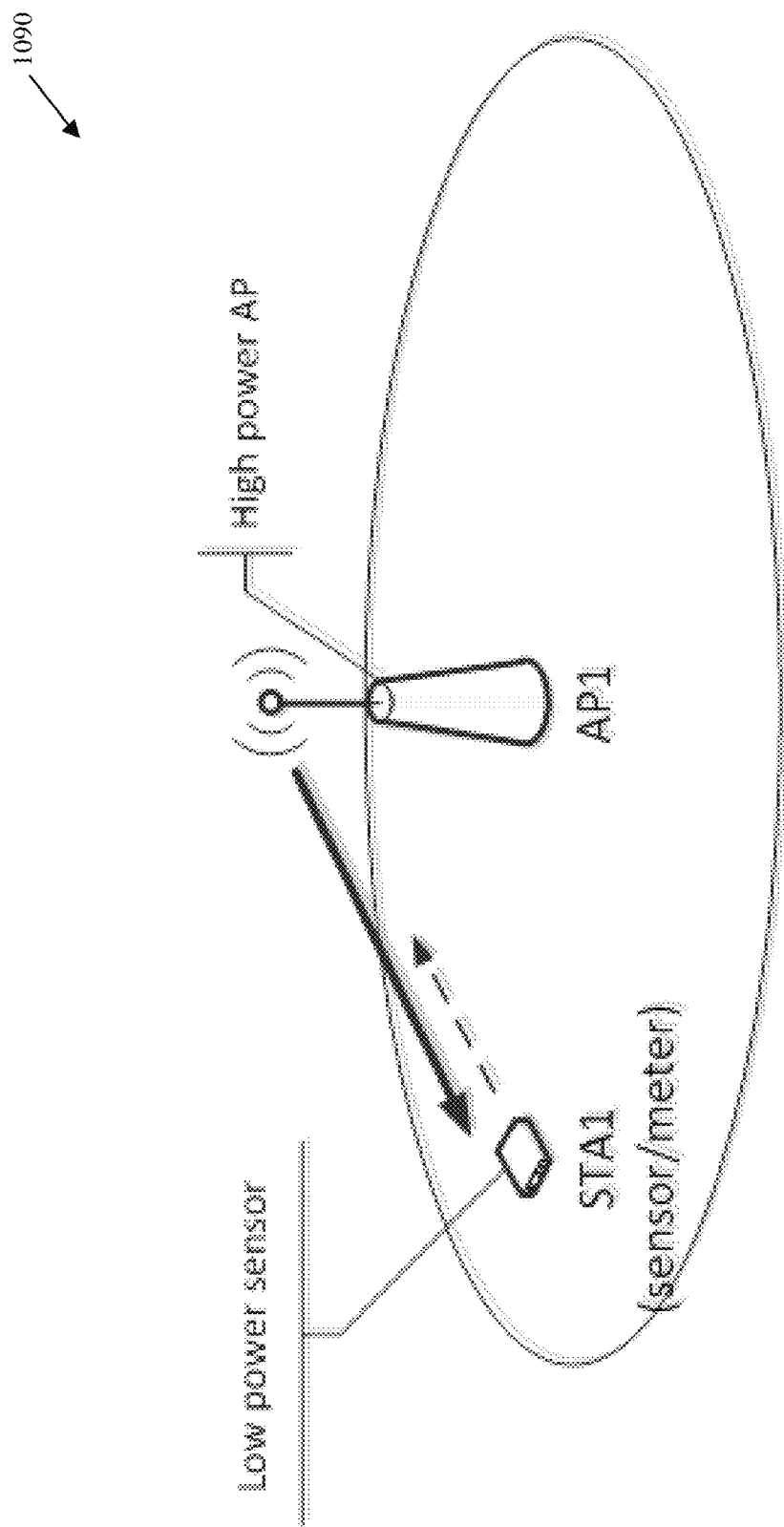
FIG. 1A depicts an alternative embodiment of a wireless network comprising an access point (AP) and a station (STA)
Figure 1B:
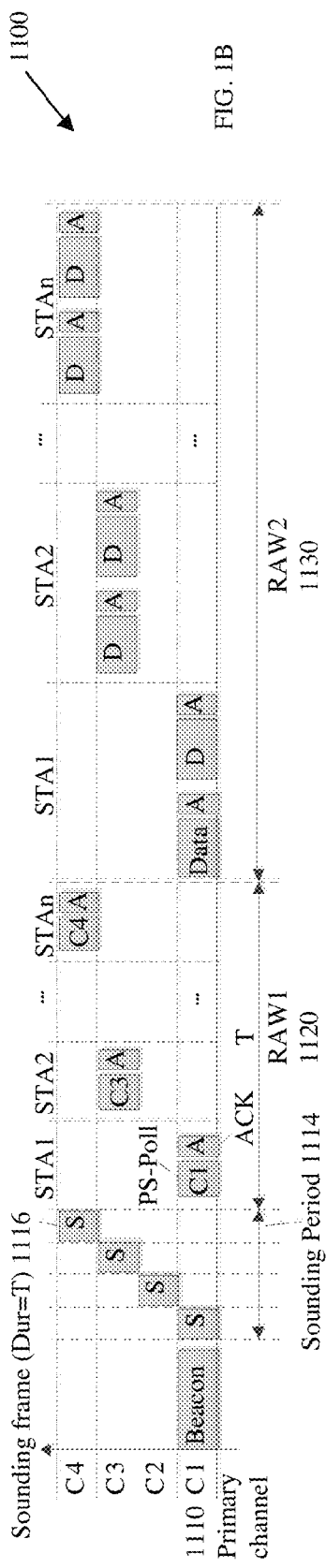
FIG. 1B depicts an embodiment of a timing diagram for a frequency selective transmission for reserved access window (RAW) based channel access.
Figure 1C:
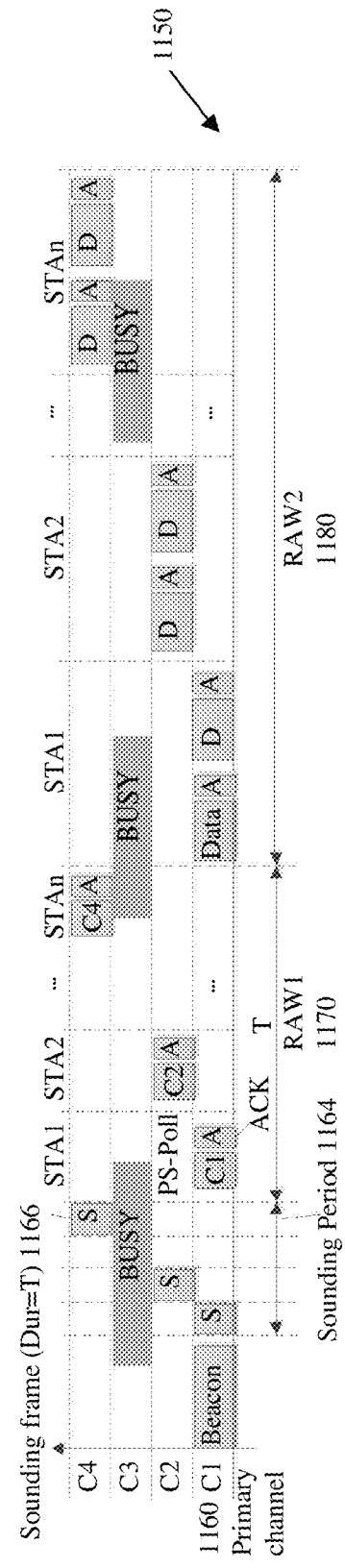
FIG. 1C depicts the embodiment of the timing diagram in FIG. 1B wherein the third sub-channel is not idle or is otherwise determined to be busy.

The frequency selective transmission logic of each of the communications devices 1030, 1050, and 1055 may transmit a power-saving poll (PS-Poll) or other trigger frame during a PS-Poll/trigger phase, restricted access window 1 (RAW1) to indicate the selected sub-channel to the communications device 1010 such as the RAW1 in FIGS. 1B-C. In response, the communications device 1010 may receive the PS-Poll or trigger frames from the communications devices 1030, 1050, and 1055 during RAW1 and the frequency selective transmission logic 1015 may record the selected sub-channel index in memory 1011 for each of the communications devices 1030, 1050, and 1055.

During a data exchange phase, restricted access window 2 (RAW2), the communications devices 1030, 1050, and 1055 may communicate with the communications device 1010 during their respective, assigned time slots. For instance, a frame builder 1033 of communications device 1030 may generate or select a frame based upon a frame structure 1032 in memory 1031 of communications device 1030. The medium access control (MAC) sublayer logic 1038 may communicate with the physical layer (PHY) logic 1039 to transmit the frame to the PHY logic 1039 of communications device 1030. In some embodiments, the frequency selective transmission logic of the stations may transmit a report of information collected about the sub-channels to the communications device 1010 so that the frequency selective transmission logic 1015 may determine whether to include the sub-channel in the subset of channels selected for use in the subsequent beacon interval.

In several embodiments, the report may be the result of periodic scans performed by the stations on the sub-channels. In particular, the frequency selective transmission logic of stations may periodically scan all the sub-channels or the sub-channels that the station might access for communications with the communications device 1010. During the scans, the frequency selective transmission logic of stations may collect information about the sub-channels such as the activity on the sub-channel by their BSS and other BSSs and the channel condition amongst other information. The frequency selective transmission logic of stations may store the information collected in memory such as the memory 1031 of the communications device 1030 and transmit a report on the information to the communications device 1010 during the next or another subsequent RAW for data exchange with the communications device 1010.

In some embodiments, among other information collected, the frequency selective transmission logic of stations associated with the communications device 1010 may monitor or scan for beacons or other frames from other BSSs that may include an intolerance bit such as the coexist frame 1014. The frequency selective transmission logic of stations may parse and interpret the frames to determine whether the intolerance bit is set to indicate that the sub-channel should not be used. If the intolerance bit is set, the frequency selective transmission logic of stations may determine that the station should not use the sub-channel at least for a time duration. In other words, the frequency selective transmission logic of stations may remove the sub-channel from the subset of sub-channels from which the station may select for communications with the communications device 1010.

In further embodiments, the frequency selective transmission logic of stations may report the collected information to the communications device 1010 so that the communications device 1010 can decide which sub-channels to include in the sub-set of sub-channels to use for transmitting sounding packets. For example, in an 8 MHz wide BSS, with 2 MHz sub-channels, stations operating on >2 MHz channels or utilizing frequency selectivity transmission may be required to scan the sub-channels in the subset of sub-channels for use. Scanning may be similar to IEEE 802.11n 20 and 40 MHz scanning in 2.4 GigaHertz (GHz). The frequency selective transmission logic of stations may receive an intolerant bit from an OBSS on a sub-channel such as sub-channel 3 and, in response, the frequency selective transmission logic of stations may communicate an indication of the intolerance bit to the communications device 1010. In response, the frequency selective transmission logic 1015 and 1035, and the frequency selective transmission logic of stations may avoid using sub-channel 3 only, but may continue to use sub-channels 1, 2, and 4. Furthermore, the BSS may still transmit 4 MHz signals on sub-channels 1 and 2.

In many embodiments, the frequency selective transmission logic 1015 may remove the sub-channel 3 from the subset of sub-channels on which the communications device 1010 will transmit sounding packets, at least for a time duration, thus preventing the stations from selecting the sub-channel. In further embodiments, the frequency selective transmission logic 1015 may communicate the intolerance bit to the stations within its BSS via the coexist frame 1014.

FIG. 1A illustrates an alternative embodiment of a wireless network 1090 comprising an access point (AP) and a station (STA). In this embodiment, the AP may comprise a high-powered communications device and the STA may comprise battery-powered sensor or meter that collects data and wakes periodically to transmit the data to the AP. In the present embodiment, the AP may establish a frequency selective transmission protocol with the STA based upon the capabilities of the station via frequency selective transmission logic. In particular, the station may be capable of receiving a narrow bandwidth communication. In such embodiments, the AP may establish a sounding duration to transmit sounding packets transmitted across all sub-channels sequentially to facilitate selection of the sub-channel by the STA. In other embodiments, the STA may be capable of receiving wideband transmissions and the AP may transmit all the sounding packets transmitted across all sub-channels simultaneously. In further embodiments, the AP may transmit all the sounding packets transmitted across all sub-channels simultaneously multiple times.

In the present embodiment, the available sub-channels for transmission may be narrowed by the frequency selective transmission protocol in which each STA collects activity of each sub-channel and reports to the AP. For instance, each STA may periodically scan sub-channels it wants to use. In some embodiments, the STA may periodically scan sub-channels on which it has already received the sounding packets successfully. If a sub-channel is busy, the STA does not use that sub-channel for packet transmissions for a duration of time (e.g. 30 minutes like radar detection).

In some of these embodiments, if the STA receives and decodes a beacon that contains the intolerance bit (such as IEEE 802.11n compliant devices) indicating not to use this sub-channel, the STA avoids using this sub-channel for a duration of time. The STA may then report the collected information to the AP so that the AP can decide which sub-channels to use for transmitting sounding packets. In many embodiments, one or more of the frequency selective transmission protocols described herein with respect to FIG. 1A may be used in conjunction with one or more of the frequency selective transmission protocols described in conjunction with FIG. 1.

FIG. 1B depicts an embodiment of a timing diagram 1100 for frequency selective transmission for reserved access window (RAW) based channel access in which none of the sub-channels are busy or otherwise determined not to be idle. In this embodiment, the AP may assign time slots to STAs through a beacon transmitted at the beginning of the beacon interval on the primary sub-channel (C1) 1110. The beacon may include assignments for time slots for each of the stations within the BSS of the AP that participates in the RAW based channel access. Each STA may communicate with the AP during the assigned time slot during RAW1 1120 (the PS-Poll/trigger phase) and the assigned time slot during RAW2 1130 (the data exchange phase).

The AP may also allocate a time slot for sounding. The AP may sense each sub-channel (C1, C2, C3, and C4) a short interframe space (SIFS) before the scheduled time for transmission of the sounding packet. If the sub-channel is busy or the AP otherwise determines to skip the sub-channel, the AP may not transmit a sounding packet on the sub-channel. In the present embodiment, the sub-channels are idle so the AP may send sounding packets 1116 over all the sub-channels (e.g. four 2 MHz channels) sequentially. The STAs may receive the sounding packets 1116 during the sounding period 1114 and each STA (STA1, STA2, through STAn) may choose any one of the sub-channels on which the STA receives a sounding packet 1116.

In the present embodiment, the AP may reserve a time duration (T) for the PS-Poll/trigger phase, RAW1 1120. A STA selects a sub-channel (e.g., the best sub-channel in terms of signal to noise, signal strength, and/or other) and transmits a PS-Poll/trigger frame on that sub-channel. The STA may not need to signal the index for the selected sub-channel in the PS-Poll/trigger frame since the AP can determine the sub-channel selected by the STA from the sub-channel on which the AP received the PS-Poll/trigger frame. The AP may record the selected sub-channel index for each STA and may use that sub-channel for data exchanges during the assigned time slot in the data exchange phase, RAW2 1130. In many embodiments, the AP has to be able to decode a packet received on any sub-channel.

In many embodiments, the AP records the selected sub-channel index for each STA and uses that sub-channel for data exchanges during the assigned time slot in the data exchange phase, RAW2 1120. During RAW2 1130, the STAs may transmit data to the AP and, in some embodiments, the STAs may report to the AP sub-channel information collected by the STAs.

FIG. 1C depicts an embodiment of a timing diagram 1150 for frequency selective transmission for reserved access window (RAW) based channel access in which the third sub-channel of the four sub-channels is busy or otherwise determined not to be idle. In this embodiment, each STA periodically scans sub-channels it might access to communicate with the AP. The AP may allocate a time slot for sounding and transmit an indication of the time slot in a beacon transmission to the associated STAs. During the sounding period 1164, the AP may sense each sub-channel (C1, C2, C3, and C4) a short interframe space (SIFS) before the scheduled time for transmission of the sounding packet. If the sub-channel is busy or the AP otherwise determines to skip the sub-channel, the AP may not transmit a sounding packet on the sub-channel. In the present embodiment, the sub-channels (C1, C2, and C4) are idle but the sub-channel C3 is busy so the AP may send sounding packets 1166 over all the sub-channels (e.g. four 2 MHz channels) sequentially except for the sub-channel C3. The STAs may receive the sounding packets 1166 during the sounding period 1164 and each STA (STA1, STA2, through STAn) may choose any one of the sub-channels C1, C2, and C4 on which the STA receives a sounding packet 1166.

If the STA independently determines that a sub-channel is busy such as sub-channel C3, the STA may not use that sub-channel for packet transmissions for a duration of time. If the STA receives and decodes a beacon that contains the intolerance bit (similar to the mechanism and intolerance bit in an IEEE 802.11n compliant device) indicating not to use a sub-channel, the STA may avoid using the sub-channel for a duration of time. In many embodiments, the STA reports the collected information to the AP so that the AP can decide which sub-channels to use for transmitting sounding packets. The AP also senses each sub-channel and sends sounding packets only on the sub-channels that are idle and the STAs select sub-channels only from the sub-channels on which the STA receives the sounding packets successfully.

In the present embodiment, the STAs do not receive a sounding packet on sub-channel C3 because the AP determined that the sub-channel C3 was busy or determined that the sub-channel C3 should not be included in the subset of sub-channels for use by the BSS during the beacon interval illustrated in FIG. 1C so the AP does not transmit a sounding packet. As a result, the STAs choose alternative sub-channels for communications during RAW1 1170, the PS-Poll/trigger phase for selecting a sub-channel, and during RAW2 1180, the data exchange phase for communications between the STAs and the AP.

In further embodiments, the communications device 1010 may facilitate data offloading. For example, communications devices that are low power sensors may include a data offloading scheme to, e.g., communicate via Wi-Fi, another communications device, a cellular network, or the like for the purposes of reducing power consumption consumed in waiting for access to, e.g., a metering station and/or increasing availability of bandwidth. Communications devices that receive data from sensors such as metering stations may include a data offloading scheme to, e.g., communicate via Wi-Fi, another communications device, a cellular network, or the like for the purposes of reducing congestion of the network 1005.

The network 1005 may represent an interconnection of a number of networks. For instance, the network 1005 may couple with a wide area network such as the Internet or an intranet and may interconnect local devices wired or wirelessly interconnected via one or more hubs, routers, or switches. In the present embodiment, network 1005 communicatively couples communications devices 1010, 1030, 1050, and 1055.

The communication devices 1010 and 1030 comprise memory 1011 and 1031, and MAC sublayer logic 1018 and 1038, respectively. The memory 1011 and 1031 may comprise a storage medium such as Dynamic Random Access Memory (DRAM), read only memory (ROM), buffers, registers, cache, flash memory, hard disk drives, solid-state drives, or the like. The memory 1011 and 1031 may store the frames and/or the frame structures such as standard frame structures identified in IEEE 802.11.

Referring again to FIG. 1, the MAC sublayer logic 1018, 1038 may comprise logic to implement functionality of the MAC sublayer of the data link layer of the communications device 1010, 1030. The MAC sublayer logic 1018, 1038 may generate the frames such as management frames, data frames, and control frames, and may communicate with the PHY logic 1019, 1039 to transmit the frames. The PHY logic 1019, 1039 may generate physical layer protocol data units (PPDUs) based upon the frames. More specifically, the frame builders 1013 and 1033 may generate the frames and data unit builders of the PHY logic 1019, 1039 may encapsulate the frames with preambles to generate PPDUs for transmission via a physical layer device such as the transceivers (RX/TX) 1020 and 1040.

The coexist frame 1014, also referred to as a MAC layer Service Data Unit (MSDU), may comprise a management frame. For example, frame builder 1013 may generate a management frame such as the coexist frame 1014 to communicate an indication of the intolerance bit to STAs and may generate the beacon frame to identify time slot assignments as well as capabilities of the communications device 1010 such as supported data rates, privacy settings, quality of service support (QoS), power saving features, cross-support, and a service set identification (SSID) of the network to identify the network to the communications device 1030. For instance, the communications devices 1010, 1030, 1050, and 1055 may be compliant with IEEE 802.11ah, which supports mandatory 1 MHz and 2 MHz channel bandwidths and optional 4 MHz, 8 MHz, and 16 MHz channel bandwidths. Although a much narrower channel bandwidth improves receiver sensitivity by 10-20 times compared to 20 MHz channel bandwidth of 802.11 in 2.4 GHz and 5 GHz bands, 1 or 2 MHz signal transmissions may experience high multipath fading loss due to much reduced frequency diversity compared to 20 MHz signal transmissions. In many embodiments, the frequency selective transmission schemes may attenuate the loss by utilizing the narrow band sub-channels within the wide bandwidth channels such as 1 MHz or 2 MHz sub-channels.

The communications devices 1010, 1030, 1050, and 1055 may each comprise a transceiver such as transceivers 1020 and 1040. Each transceiver 1020, 1040 comprises a radio 1023, 1043 comprising an RF transmitter and an RF receiver. Each RF transmitter impresses digital data onto an RF frequency for transmission of the data by electromagnetic radiation. An RF receiver receives electromagnetic energy at an RF frequency and extracts the digital data therefrom.

FIG. 1 may depict a number of different embodiments including a Multiple-Input, Multiple-Output (MIMO) system with, e.g., four spatial streams, and may depict degenerate systems in which one or more of the communications devices 1010, 1030, 1050, and 1055 comprise a receiver and/or a transmitter with a single antenna including a Single-Input, Single Output (SISO) system, a Single-Input, Multiple Output (SIMO) system, and a Multiple-Input, Single Output (MISO) system.

In many embodiments, transceivers 1020 and 1040 implement orthogonal frequency-division multiplexing (OFDM). OFDM is a method of encoding digital data on multiple carrier frequencies. OFDM is a frequency-division multiplexing scheme used as a digital multi-carrier modulation method. A large number of closely spaced orthogonal sub-carrier signals are used to carry data. The data is divided into several parallel data streams or channels, one for each sub-carrier. Each sub-carrier is modulated with a modulation scheme at a low symbol rate, maintaining total data rates similar to conventional single-carrier modulation schemes in the same bandwidth.

An OFDM system uses several carriers, or "tones," for functions including data, pilot, guard, and nulling Data tones are used to transfer information between the transmitter and receiver via one of the channels. Pilot tones are used to maintain the channels, and may provide information about time/frequency and channel tracking. Guard interval may be inserted between symbols such as the short training field (STF) and long training field (LTF) symbols during transmission to avoid inter-symbol interference (ISI), which might result from multi-path distortion. Guard tones help the signal conform to a spectral mask. The nulling of the direct component (DC) may be used to simplify direct conversion receiver designs.

In some embodiments, the communications device 1010 optionally comprises a Digital Beam Former (DBF) 1022, as indicated by the dashed lines. The DBF 1022 transforms information signals into signals to be applied via the radio 1023, 1043 to elements of an antenna array 1024. The antenna array 1024 is an array of individual, separately excitable antenna elements. The signals applied to the elements of the antenna array 1024 cause the antenna array 1024 to radiate one to four spatial channels. Each spatial channel so formed may carry information to one or more of the communications devices 1030, 1050, and 1055. Similarly, the communications device 1030 comprises a transceiver 1040 to receive and transmit signals from and to the communications device 1010. The transceiver 1040 may comprise an antenna array 1044 and, optionally, a DBF 1042.

Figure 2:
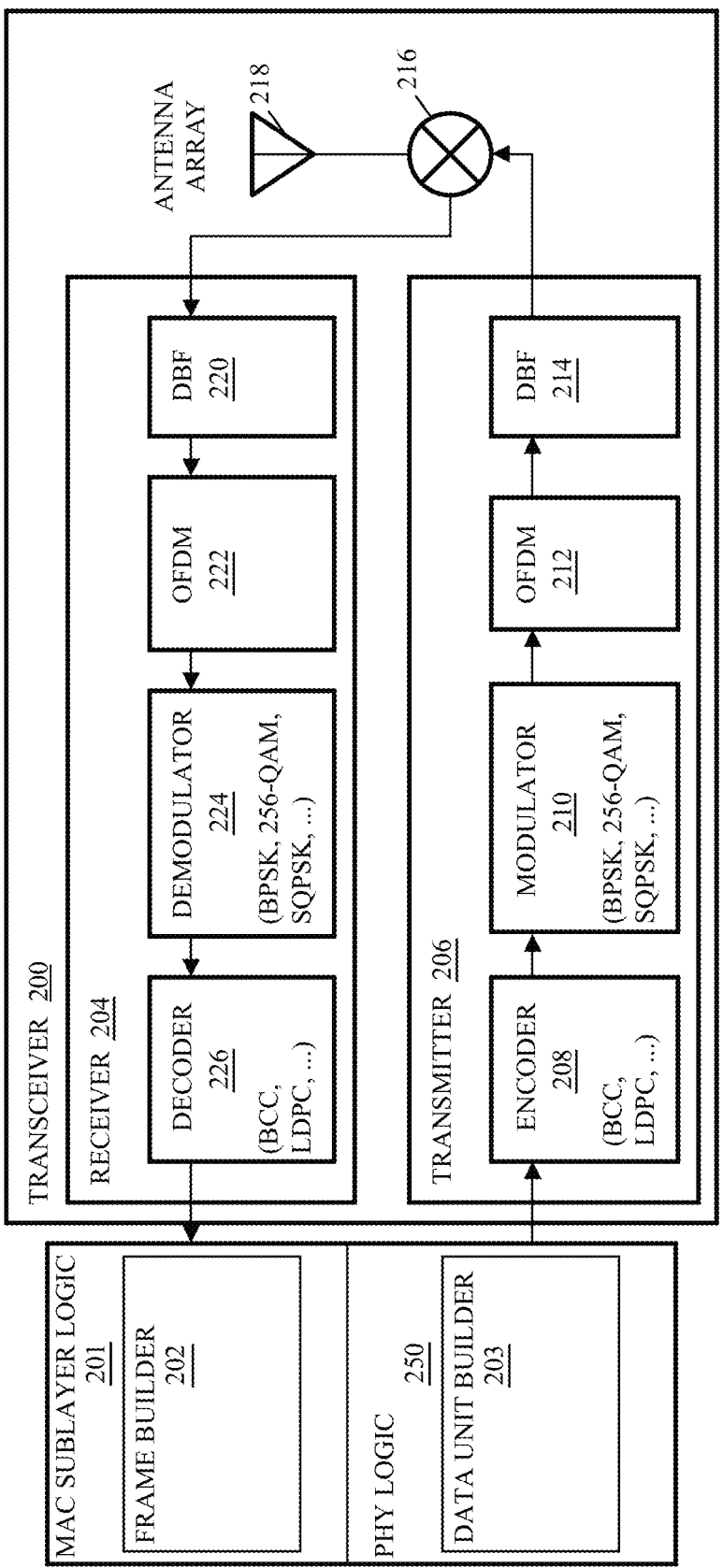
FIG. 2 depicts an embodiment of an apparatus for frequency selective transmission.

FIG. 2 depicts an embodiment of an apparatus to generate, communicate, transmit, receive, communicate, and interpret a frame. The apparatus comprises a transceiver 200 coupled with medium access control (MAC) sublayer logic 201. The MAC sublayer logic 201 may determine a frame such as an association request frame, an association response frame, or a beacon frame, and transmit the frame to the physical layer (PHY) logic 250. The PHY logic 250 may determine the PPDU by determining a preamble and encapsulating the frame with a preamble to transmit via transceiver 200.

In many embodiments, the MAC sublayer logic 201 may comprise a frame builder 202 to generate frames (MPDUs). For embodiments such as communications devices that associate with an access point, the MAC sublayer logic 201 may generate an association request that includes fields descriptive of capabilities of the communications device. The MAC sublayer logic 201 may then receive and parse and interpret an association response frame to determine the slot times defined for the communications device. The MAC sublayer logic 201 may also generate data frames for transmitting information such as reports of information collected about sub-channels via scans of the sub-channels and/or by receiving beacons from other basic service sets. For embodiments such as access points, the MAC sublayer logic 201 may comprise a frame builder 202 to generate association response frames and beacons to define slot times for communications between other communications devices and the access point such as a sounding period and restricted access windows for a PS-Poll/trigger phase and a data exchange phase.

The PHY logic 250 may comprise a data unit builder 203. The data unit builder 203 may determine a preamble and the PHY logic 250 may encapsulate the MPDU with the preamble to generate a PPDU. In many embodiments, the data unit builder 203 may create the preamble based upon communications parameters chosen through interaction with a destination communications device.

The transceiver 200 comprises a receiver 204 and a transmitter 206. The transmitter 206 may comprise one or more of an encoder 208, a modulator 210, an OFDM 212, and a DBF 214. The encoder 208 of transmitter 206 receives and encodes data destined for transmission from the MAC sublayer logic 202 with, e.g., a binary convolutional coding (BCC), a low density parity check coding (LDPC), and/or the like. The modulator 210 may receive data from encoder 208 and may impress the received data blocks onto a sinusoid of a selected frequency via, e.g., mapping the data blocks into a corresponding set of discrete amplitudes of the sinusoid, or a set of discrete phases of the sinusoid, or a set of discrete frequency shifts relative to the frequency of the sinusoid. The output of modulator 210 is fed to an orthogonal frequency division multiplexer (OFDM) 212, which impresses the modulated data from modulator 210 onto a plurality of orthogonal sub-carriers. And, the output of the OFDM 212 may be fed to the digital beam former (DBF) 214 to form a plurality of spatial channels and steer each spatial channel independently to maximize the signal power transmitted to and received from each of a plurality of user terminals.

The transceiver 200 may also comprise duplexers 216 connected to antenna array 218. Thus, in this embodiment, a single antenna array is used for both transmission and reception. When transmitting, the signal passes through duplexers 216 and drives the antenna with the up-converted information-bearing signal. During transmission, the duplexers 216 prevent the signals to be transmitted from entering receiver 204. When receiving, information bearing signals received by the antenna array pass through duplexers 216 to deliver the signal from the antenna array to receiver 204. The diplexers 216 then prevent the received signals from entering transmitter 206. Thus, duplexers 216 operate as switches to alternately connect the antenna array elements to the receiver 204 and the transmitter 206.

The antenna array 218 radiates the information bearing signals into a time-varying, spatial distribution of electromagnetic energy that can be received by an antenna of a receiver. The receiver can then extract the information of the received signal.

The transceiver 200 may comprise a receiver 204 for receiving, demodulating, and decoding information bearing signals. The receiver 204 may comprise one or more of a DBF 220, an OFDM 222, a demodulator 224 and a decoder 226. The received signals are fed from antenna elements 218 to a Digital Beam Former (DBF) 220. The DBF 220 transforms N antenna signals into L information signals. The output of the DBF 220 is fed to the OFDM 222. The OFDM 222 extracts signal information from the plurality of subcarriers onto which information-bearing signals are modulated. The demodulator 224 demodulates the received signal, extracting information content from the received signal to produce an un-demodulated information signal. And, the decoder 226 decodes the received data from the demodulator 224 and transmits the decoded information, the MPDU, to the MAC sublayer logic 201.

After receiving a frame, the MAC sublayer logic 201 may access frame structures in memory to parse the frame to determine, e.g., whether the access point is buffering data for the communications device, the bit position of the bit, the beacon sequence number, and/or the like. Based upon this information, the MAC sublayer logic 201 may determine a slot time for communicating with an access point. The MAC sublayer logic 201 may communicate with the access point by transmitting a trigger frame such as a PS-Poll frame to trigger the access point to transmit the data being buffered for the communications device by the access point to the communications device.

Persons of skill in the art will recognize that a transceiver may comprise numerous additional functions not shown in FIG. 2 and that the receiver 204 and transmitter 206 can be distinct devices rather than being packaged as one transceiver. For instance, embodiments of a transceiver may comprise a Dynamic Random Access Memory (DRAM), a reference oscillator, filtering circuitry, synchronization circuitry, an interleaver and a deinterleaver, possibly multiple frequency conversion stages and multiple amplification stages, etc. Further, some of the functions shown in FIG. 2 may be integrated. For example, digital beam forming may be integrated with orthogonal frequency division multiplexing. In some embodiments, for instance, the transceiver 200 may comprise one or more processors and memory including code to perform functions of the transmitter 206 and/or receiver 204.

Figures 3, 4A, 4B:
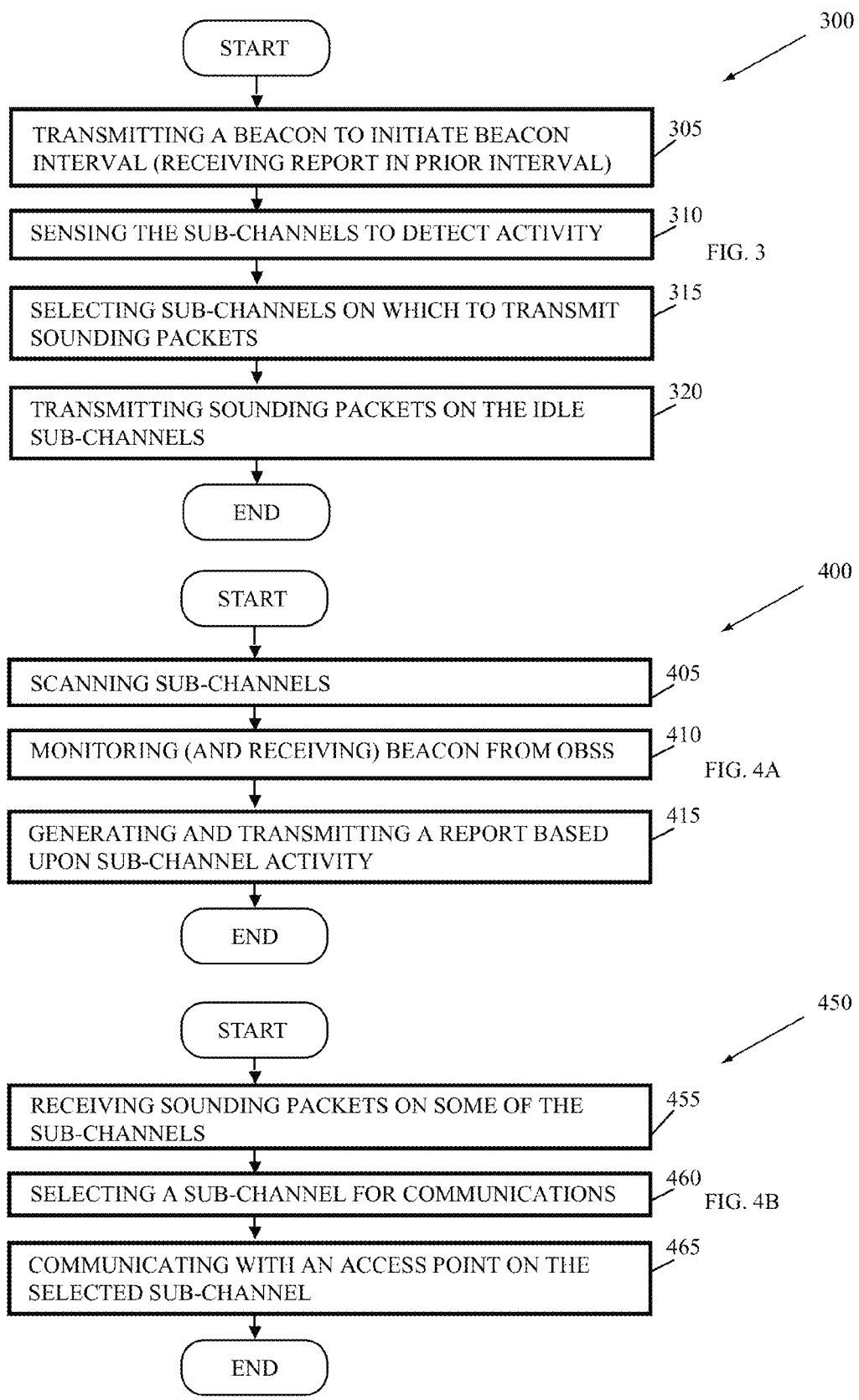
FIG. 3 depicts an embodiment of a flowchart for frequency selective transmission as discussed in conjunction with FIGS. 1-2.
FIGS. 4A-B depict embodiments of flowcharts for frequency selective transmission as discussed in conjunction with FIGS. 1-2.

FIG. 3 depicts an embodiment of a flowchart 300 for frequency selective transmission as discussed in conjunction with FIGS. 1-2. The flowchart begins with a communications device such as an access point transmitting a beacon to initiate a beacon interval (element 305). In many embodiments, the beacons transmitted by the access point may include indications of time slots for the sounding packets on each of the sub-channels, allocations of time slots for each of the stations in a PS-Poll/trigger phase of communications with the access point, and allocations of time slots for stations during the data exchange phase of communications with the access point. The inclusion of the time slots information for sounding packets allows a station to determine that a sounding packet has not been transmitted on a sub-channel. After determining that the sounding packet has not been transmitted on a sub-channel, the station may switch to the next sub-channel to receive the sounding frame for the next sub-channel.

In some embodiments, the access point may receive a report during the prior beacon interval that includes information about the sub-channels such as information collected by stations associated with the access point. For instance, the stations may collect information related to activity on the sub-channel such as active communications by other BSSs or other traffic, having a beacon transmission that included an intolerance bit that indicated that the sub-channel should not be used, the channel condition such as the signal strength received by a station from the access point, and/or the like.

Once the sounding period begins, the communications device may sense the sub-channels to detect activity (element 310). In some embodiments, the communications device may transmit the sounding packets sequentially and scan the sub-channel just prior to transmission of a sounding packet on the sub-channel such as a short interframe space prior to the transmission of a sounding packet. If the sub-channel is not idle, the access point may skip transmission of a sounding packet on the sub-channel. If the sub-channel is idle but the access point received one or more reports from one or more stations with a BSS of the access point, the access point may determine not to use the sub-channel based upon information about the sub-channel in the one or more reports. On the other hand, if the sub-channel is idle and the access point did not receive reports or did not receive information leading the access point to determine not to use the sub-channel, the access point may transmit the sounding packet on the sub-channel.

In some embodiments, the stations do not transmit reports to the access point so the access point determines whether or not to use a sub-channel based upon whether or not the sub-channel is idle. In further embodiments, the access point may maintain a history or log of information about a sub-channel such as detection of the sub-channel being busy and/or reports from stations. The access point may then determine whether to use a sub-channel based upon the history or log for the sub-channel.

After sensing the sub-channels to detect activity and, in some embodiments, receiving a report, the communications device may select sub-channels on which to transmit sounding packets (element 315). In many embodiments, the access point may sense and select or not select a sub-channel an interframe space prior to sending the sounding packet so the sensing and selecting may repeat for each sub-channel as the access point hops between the sub-channels. In some embodiments, if the access point determines not to use a sub-channel based upon, e.g., prior activity on a sub-channel, reports about a sub-channel, an intolerance bit received for a sub-channel, and/or the like, the access point may include a sounding packet schedule in the beacon that does not include that sub-channel and, thus, provide additional time durations for data exchanges on the remaining sub-channels.

After selecting the sub-channels, the access point may transmit sounding packets on the sub-channels (element 320). Again, this may be an iterative process that involves sensing the sub-channel, selecting the sub-channel, and then transmitting the sounding packet on the sub-channel, one sub-channel at a time until the access point has either transmitted a sounding packet on or skipped each of the sub-channels in a wide bandwidth channel.

FIGS. 4A-B depict embodiments of flowcharts 400 and 450 for frequency selective transmission as discussed in conjunction with FIGS. 1-2. In particular, FIG. 4A may describe a station such as the communications device 1030 in FIG. 1 that collects information about activity of each of the sub-channels and transmits the information collected to the access point. The flowchart begins with a station scanning sub-channels (element 405). Each station may periodically scan sub-channels that the station may use to communicate with an access point. While scanning the sub-channels, the station may collect information about the sub-channels such as whether the sub-channels are busy or idle or the traffic load on the sub-channel, the signal strength with which the station receives the communications on the sub-channel, whether or not the station receives communications on the sub-channel from other BSSs, and/or the like. In some embodiments, if the sub-channel is busy, the station may determine not to use the sub-channel for a duration of time such as 30 minutes as is used in radar detection.

While scanning the sub-channels, the station may monitor for beacon transmissions from other BSSs (element 410). In some embodiments, the station may receive the beacon frames from the other BSSs and parse and interpret the beacon frame to determine whether or not an intolerance bit is set to indicate that the sub-channel should not be used. In such embodiments, the station may determine that the station will not use the sub-channel for a duration of time. And, in some embodiments, the stations may periodically scan sub-channels on which the station successfully received sounding packets.

After collecting information about one or more sub-channels, each station in a BSS may generate and transmit a report comprising information collected to the access point (element 415). In some embodiments, the station may act on the information collected about the sub-channels by determining whether or not to include the sub-channel in a set of sub-channels that the station may access to communicate with the access point. In other embodiments, the station may provide the information collected about the sub-channels to the access point to let the access point determine whether or not to use a sub-channel based upon the information. In still other embodiments, the station may use the information collected and report the information collected to the access point so the access point can make more general determinations regarding the use of the sub-channel for all the stations within its BSS.

FIG. 4B depicts a flowchart 450 for an embodiment for selective frequency transmission. The flowchart 450 beings with a station receiving sounding packets on some of the sub-channels (element 455). The station may wait for a period of time on each of the sub-channels to receive a sounding packet but on some sub-channels, the station may not receive a sounding packet because the access point determined that the sub-channel would not be used. After waiting the time duration within which the sounding packet should have been received, the station may hop to the next sub-channel to await a sounding packet. In many embodiments, when the access point does not send a sounding packet on a sub-channel or the station does not otherwise receive a sounding packet on the sub-channel, the station may determine that the sub-channel is not available to the station for communications with the access point.

After receiving sounding packets on some of the sub-channels, the station may select a sub-channel for communications with the access point (element 460). For instance, the station may determine whether or not to select a sub-channel by determining if the sub-channel has acceptable communications characteristics. In some embodiments, the stations may avoid a sub-channel that has a low signal strength or heavy traffic. On the other hand, the station may select a channel if the channel meets acceptable criteria for communications with the access point. In several embodiments, the acceptable criteria may relate to a signal to noise ratio of received communications on the channel, the bit error rate for communications on the channel, the strength of the signal received from the access point over the sub-channel, the number of other devices in other BSSs that access the sub-channel, and/or the like.

In many embodiments, the station communicates the selected sub-channel to the access point during a first restricted access window referred to as the PS-Poll/trigger phase. The station may transmit a PS-Poll or other trigger frame to the access point to indicate that the station is selecting a particular sub-channel. In many embodiments, the station may include a sub-channel index in the PS-Poll or other trigger frame to identify the sub-channel to the access point.

Once the station determines the selected sub-channel for communications with the access point, the station initiate communications with the access point on the selected sub-channel during the second restricted access window referred to as the data exchange phase (element 465). In many embodiments, the station is assigned a time slot for data exchanges in the restricted access window for data exchanges established by the beacon transmission from the access point. The station may then communicate with the access point during the stations assigned time slot.

The following examples pertain to further embodiments. One example comprises a method. The method may involve determining a set of sub-channels of a wide bandwidth channel to transmit sounding packets based upon information about the sub-channels; transmitting sounding packets wirelessly on the set of sub-channels of the wide bandwidth channel; receiving a selection of a sub-channel of the set of sub-channels from a receiving communications device; and communicating with the receiving communications device via the sub-channel.

In some embodiments, the method may further comprise receiving information about the sub-channels from one or more communications devices associated with a basic service set. In some embodiments, determining the set of sub-channels comprises sensing each of the sub-channels in the wide bandwidth channel and narrowing the set of sub-channels to the sub-channels that are idle. In many embodiments, determining the set of sub-channels comprises narrowing the set of sub-channels based upon information about the sub-channels that is received from one or more communications devices associated with a basic service set. In several embodiments, determining the set of sub-channels comprises narrowing the set of sub-channels based upon information about the sub-channels comprising an intolerance bit received from one or more communications devices associated with a basic service set. And, in some embodiments, determining the set of sub-channels comprises narrowing the set of sub-channels based upon information about the sub-channels comprising information about an intolerance bit received by one or more communications devices associated with a basic service set.

At least one computer program product for frequency selective transmission, the computer program product comprising a computer useable medium having a computer useable program code embodied therewith, the computer useable program code comprising computer useable program code configured to perform operations, the operations to carry out a method according to any one or more or all of embodiments of the method described above.

At least one system comprising hardware and code may carry out a method according to any one or more or all of embodiments of the method described above.

Another example comprises an apparatus. The apparatus may comprise logic to determine a set of sub-channels of a wide bandwidth channel to transmit sounding packets based upon information about the sub-channels; transmit sounding packets wirelessly on the set of sub-channels of the wide bandwidth channel; receive a selection of a sub-channel of the set of sub-channels from a receiving communications device; and communicate with the receiving communications device via the sub-channel; a physical layer in communication with the logic to transmit the packets.

In some embodiments, the apparatus may further comprise an antenna to transmit and memory coupled with the logic to store frames to communicate with the communications device. In some embodiments, the logic comprises medium access control logic to sense each of the sub-channels in the wide bandwidth channel and narrow the set of sub-channels to the sub-channels that are idle. In some embodiments, the logic comprises medium access control logic to narrow the set of sub-channels based upon information about the sub-channels that is received from one or more communications devices associated with a basic service set of the apparatus. In some embodiments, the logic comprises medium access control logic to narrow the set of sub-channels based upon information about the sub-channels comprising an intolerance bit received from one or more communications devices associated with a basic service set of the apparatus. And in some embodiments of the apparatus, the logic comprises medium access control logic to narrow the set of sub-channels based upon information about the sub-channels comprising information about an intolerance bit received by one or more communications devices associated with a basic service set of the apparatus.

Another example comprises a system. The system may logic to determine a set of sub-channels of a wide bandwidth channel to transmit sounding packets based upon information about the sub-channels; transmit sounding packets wirelessly on the set of sub-channels of the wide bandwidth channel; receive a selection of a sub-channel of the set of sub-channels from a receiving communications device; and communicate with the receiving communications device via the sub-channel; a physical layer in communication with the logic to transmit the packets; and an antenna to transmit and memory coupled with the logic to store frames to communicate with the communications device.

Another example comprises a program product. The program product for frequency selective transmission may comprise a storage medium comprising instructions to be executed by a processor-based device, wherein the instructions, when executed by the processor-based device, perform operations, the operations comprising: determining a set of sub-channels of a wide bandwidth channel to transmit sounding packets based upon information about the sub-channels; transmitting sounding packets wirelessly on the set of sub-channels of the wide bandwidth channel; receiving a selection of a sub-channel of the set of sub-channels from a receiving communications device; and communicating with the receiving communications device via the sub-channel.

Another example comprises a method. The method may involve receiving sounding packets wirelessly on a subset of the sub-channels of the wide bandwidth channel during a beacon interval; determining a selected sub-channel from the subset of sub-channels on which a sounding packet is received during the beacon interval; and communicating with the communications device via the selected sub-channel.

In some embodiments, the method may further comprise scanning sub-channels of the wide bandwidth channel to determine information about the sub-channels, wherein determining the selected sub-channel comprises determining the selected sub-channel based upon the information about the sub-channels. In some embodiments, the method may further comprise scanning sub-channels of the wide bandwidth channel to determine information about the sub-channels and transmitting the information about the sub-channels to the communications device. In many embodiments, the method may further comprise receiving an intolerance bit from another communications device indicating that a sub-channel should not be used and not using the sub-channel for a time duration. In several embodiments, receiving an intolerance bit from another communications device indicating that a sub-channel should not be used and transmitting an indication of the intolerance bit to the communications device. And, in some embodiments, determining the selected sub-channel comprises determining the selected channel based upon the channel condition of the selected sub-channel and activity on the selected sub-channel.

At least one computer program product for frequency selective transmission, the computer program product comprising a computer useable medium having a computer useable program code embodied therewith, the computer useable program code comprising computer useable program code configured to perform operations, the operations to carry out a method according to any one or more or all of embodiments of the method described above.

At least one system comprising hardware and code may carry out a method according to any one or more or all of embodiments of the method described above.

Another example comprises an apparatus. The apparatus may comprise logic to receive sounding packets wirelessly on a subset of the sub-channels of the wide bandwidth channel during a beacon interval; determine a selected sub-channel from the subset of sub-channels on which a sounding packet is received during the beacon interval; and communicate with the communications device via the selected sub-channel; and a physical layer in communication with the logic to receive the packets.

In some embodiments, the apparatus may further comprise an antenna coupled with the physical layer logic to transmit the communication, wherein the logic comprises medium access control logic to scan sub-channels of the wide bandwidth channel to determine information about the sub-channels. In some embodiments, the logic comprises medium access control logic to transmit the information about the sub-channels to the communications device. In some embodiments, the logic comprises medium access control logic to receive an intolerance bit from another communications device indicating that a sub-channel should not be used and refrain from using the sub-channel for a time duration. And, in some embodiments, the logic comprises medium access control logic to transmit an indication of the intolerance bit to the communications device.

Another example comprises a system. The system may comprise logic to receive sounding packets wirelessly on a subset of the sub-channels of the wide bandwidth channel during a beacon interval; determine a selected sub-channel from the subset of sub-channels on which a sounding packet is received during the beacon interval; and communicate with the communications device via the selected sub-channel; and a physical layer in communication with the logic to receive the packets; and an antenna coupled with memory.

Another example comprises a program product. The program product for frequency selective transmission may comprise a storage medium comprising instructions to be executed by a processor-based device, wherein the instructions, when executed by the processor-based device, perform operations, the operations comprising: receiving sounding packets wirelessly on a subset of the sub-channels of the wide bandwidth channel during a beacon interval; determining a selected sub-channel from the subset of sub-channels on which a sounding packet is received during the beacon interval; and communicating with the communications device via the selected sub-channel.

In some embodiments of the program product, the operations further comprise scanning sub-channels of the wide bandwidth channel to determine information about the sub-channels and transmitting the information about the sub-channels to the communications device. In some embodiments of the program product, the operations further comprise receiving an intolerance bit from another communications device indicating that a sub-channel should not be used and not using the sub-channel for a time duration. And in some embodiments, the operations further comprise receiving an intolerance bit from another communications device indicating that a sub-channel should not be used and transmitting an indication of the intolerance bit to the communications device.

In some embodiments, some or all of the features described above and in the claims may be implemented in one embodiment. For instance, alternative features may be implemented as alternatives in an embodiment along with logic or selectable preference to determine which alternative to implement. Some embodiments with features that are not mutually exclusive may also include logic or a selectable preference to activate or deactivate one or more of the features. For instance, some features may be selected at the time of manufacture by including or removing a circuit pathway or transistor. Further features may be selected at the time of deployment or after deployment via logic or a selectable preference such as a dipswitch or the like. A user after via a selectable preference such as a software preference, an e-fuse, or the like may select still further features.

A number of embodiments may have one or more advantageous effects. For instance, some embodiments may offer reduced MAC header sizes with respect to standard MAC header sizes. Further embodiments may include one or more advantageous effects such as smaller packet sizes for more efficient transmission, lower power consumption due to less data traffic on both the transmitter and receiver sides of communications, less traffic conflicts, less latency awaiting transmission or receipt of packets, and the like.

Another embodiment is implemented as a program product for implementing systems, apparatuses, and methods described with reference to FIGS. 1-4. Embodiments can take the form of an entirely hardware embodiment, a software embodiment implemented via general purpose hardware such as one or more processors and memory, or an embodiment containing both specific-purpose hardware and software elements. One embodiment is implemented in software or code, which includes but is not limited to firmware, resident software, microcode, or other types of executable instructions.

Furthermore, embodiments can take the form of a computer program product accessible from a machine-accessible, computer-usable, or computer-readable medium providing program code for use by or in connection with a computer, mobile device, or any other instruction execution system. For the purposes of this description, a machine-accessible, computer-usable, or computer-readable medium is any apparatus or article of manufacture that can contain, store, communicate, propagate, or transport the program for use by or in connection with the instruction execution system or apparatus.

The medium may comprise an electronic, magnetic, optical, electromagnetic, or semiconductor system medium. Examples of a machine-accessible, computer-usable, or computer-readable medium include memory such as volatile memory and non-volatile memory. Memory may comprise, e.g., a semiconductor or solid-state memory like flash memory, magnetic tape, a removable computer diskette, a random access memory (RAM), a read-only memory (ROM), a rigid magnetic disk, and/or an optical disk. Current examples of optical disks include compact disk-read only memory (CD-ROM), compact disk-read/write memory (CD-R/W), digital video disk (DVD)-read only memory (DVD-ROM), DVD-random access memory (DVD-RAM), DVD-Recordable memory (DVD-R), and DVD-read/write memory (DVD-R/W).

An instruction execution system suitable for storing and/or executing program code may comprise at least one processor coupled directly or indirectly to memory through a system bus. The memory may comprise local memory employed during actual execution of the code, bulk storage such as dynamic random access memory (DRAM), and cache memories which provide temporary storage of at least some code in order to reduce the number of times code must be retrieved from bulk storage during execution.

Input/output or I/O devices (including but not limited to keyboards, displays, pointing devices, etc.) can be coupled to the instruction execution system either directly or through intervening I/O controllers. Network adapters may also be coupled to the instruction execution system to enable the instruction execution system to become coupled to other instruction execution systems or remote printers or storage devices through intervening private or public networks.

Modem, Bluetooth™, Ethernet, Wi-Fi, and WiDi adapter cards are just a few of the currently available types of network adapters.

What is claimed is:

1. A method for frequency selective wireless transmission, the method comprising:
    determining, by a first communications device, a set of sub-channels of a wide bandwidth channel to transmit sounding packets based upon information about the sub-channels during a beacon interval;
    transmitting, by the first communications device, the sounding packets wirelessly on the set of sub-channels of the wide bandwidth channel;
    receiving, by the first communications device, a selection of a sub-channel of the set of sub-channels for communication during the beacon interval from a receiving communications device; and
    communicating, by the first communications device, with the receiving communications device via the sub-channel, the first communications device responsive to the selection of the sub-channel by transmission during the beacon interval to the receiving communications device via the sub-channel.

2. The method of claim 1, further comprising receiving information about the sub-channels from one or more communications devices associated with a basic service set.

3. The method of claim 1, wherein determining the set of sub-channels comprises sensing each of the sub-channels in the wide bandwidth channel and narrowing the set of sub-channels to the sub-channels that are idle.

4. The method of claim 1, wherein determining the set of sub-channels comprises narrowing the set of sub-channels based upon information about the sub-channels that is received from one or more communications devices associated with a basic service set.

5. The method of claim 1, wherein determining the set of sub-channels comprises narrowing the set of sub-channels based upon information about the sub-channels comprising an intolerance bit received from one or more communications devices associated with a basic service set.

6. The method of claim 1, wherein determining the set of sub-channels comprises narrowing the set of sub-channels based upon information about the sub-channels received from one or more communications devices comprising information about an intolerance bit received by the one or more communications devices associated with a basic service set.

7. An apparatus for frequency selective wireless transmission, the apparatus comprising:
    logic comprising hardware the logic to determine a set of sub-channels of a wide bandwidth channel to transmit sounding packets based upon information about the sub-channels during a beacon interval; transmit the sounding packets wirelessly on the set of sub-channels of the wide bandwidth channel; receive a selection of a sub-channel of the set of sub-channels for communication during the beacon interval from a receiving communications device; and communicate with the receiving communications device via the sub-channel, the logic responsive to the selection of the sub-channel by transmission during the beacon interval to the receiving communications device via the sub-channel; and
    a physical layer in communication with the logic to transmit the packets.

8. The apparatus of claim 7, further comprising an antenna to transmit and memory coupled with the logic to store frames to communicate with the communications device.

9. The apparatus of claim 7, wherein the logic comprises medium access control logic to sense each of the sub-channels in the wide bandwidth channel and narrow the set of sub-channels to the sub-channels that are idle.

10. The apparatus of claim 7, wherein the logic comprises medium access control logic to narrow the set of sub-channels based upon information about the sub-channels that is received from one or more communications devices associated with a basic service set of the apparatus.

11. The apparatus of claim 7, wherein the logic comprises medium access control logic to narrow the set of sub-channels based upon information about the sub-channels comprising an intolerance bit received from one or more communications devices associated with a basic service set of the apparatus.

12. The apparatus of claim 7, wherein the logic comprises medium access control logic to narrow the set of sub-channels based upon information about the sub-channels received from one or more communications devices comprising information about an intolerance bit received by the one or more communications devices associated with a basic service set of the apparatus.

13. A program product for frequency selective wireless transmission, the program product comprising:
    a non-transitory medium comprising instructions to be executed by a processor-based device, wherein the instructions, when executed by the processor-based device, perform operations, the operations comprising:
    determining, by a first communications device, a set of sub-channels of a wide bandwidth channel to transmit sounding packets based upon information about the sub-channels during a beacon interval;
    transmitting, by the first communications device, the sounding packets wirelessly on the set of sub-channels of the wide bandwidth channel;
    receiving, by the first communications device, a selection of a sub-channel of the set of sub-channels for communication during the beacon interval from a receiving communications device; and
    communicating, by the first communications device, with the receiving communications device via the sub-channel, the first communications device responsive to the selection of the sub-channel by transmission during the beacon interval to the receiving communications device via the sub-channel.

14. The program product of claim 13, wherein the operations further comprise:
    determining the set of sub-channels comprises sensing each of the sub-channels in the wide bandwidth channel and narrowing the set of sub-channels to the sub-channels that are idle.

15. The program product of claim 13, wherein the operations further comprise:
    narrowing the set of sub-channels based upon information about the sub-channels that is received from one or more communications devices associated with a basic service set.

16. A method for frequency selective wireless transmission, the method comprising:
    receiving, by a first communications device, sounding packets wirelessly on a subset of sub-channels of a wide bandwidth channel during a beacon interval;
    determining, by the first communications device, a selected sub-channel from the subset of the sub-channels on which a sounding packet is received by the first communications device during the beacon interval; and
    communicating, by the first communications device, with a second communications device via the selected sub-channel, selection of the selected sub-channel for communication during the beacon interval, wherein the first communications device is configured to communicate exclusively via the selected sub-channel during the beacon interval after communication of the selection.

17. The method of claim 16, further comprising scanning sub-channels of the wide bandwidth channel to determine information about the sub-channels, wherein determining the selected sub-channel comprises determining the selected sub-channel based upon the information about the sub-channels.

18. The method of claim 17, further comprising scanning sub-channels of the wide bandwidth channel to determine information about the sub-channels and transmitting the information about the sub-channels to the second communications device.

19. The method of claim 16, further comprising receiving an intolerance bit from another communications device indicating that a sub-channel should not be used and not using the sub-channel for a time duration.

20. The method of claim 16, further comprising receiving an intolerance bit from another communications device indicating that a sub-channel should not be used and transmitting an indication of the intolerance bit to the second communications device.

21. The method of claim 16, wherein determining the selected sub-channel comprises determining the selected channel based upon a channel condition of the selected sub-channel during receipt of the sounding packets.

22. An apparatus for frequency selective wireless transmission, the apparatus comprising:
   logic comprising hardware, the logic to receive sounding packets wirelessly on a subset of sub-channels of a wide bandwidth channel during a beacon interval; determine a selected sub-channel from the subset of sub-channels on which a sounding packet is received by the apparatus during the beacon interval; and communicate with a communications device via the selected sub-channel, selection of the selected sub-channel for communication during the beacon interval, wherein the logic is configured to communicate exclusively via the selected sub-channel during the beacon interval after communication of the selection; and
   a physical layer in communication with the logic to receive the packets.

23. The apparatus of claim 22, wherein the logic comprises medium access control logic to scan sub-channels of the wide bandwidth channel to determine information about the sub-channels.

24. The apparatus of claim 23, wherein the logic comprises medium access control logic to transmit the information about the sub-channels to the communications device.

25. The apparatus of claim 22, wherein the logic comprises medium access control logic to receive an intolerance bit from another communications device indicating that a sub-channel should not be used and refrain from using the sub-channel for a time duration.

26. The apparatus of claim 25, wherein the logic comprises medium access control logic to transmit an indication of the intolerance bit to the communications device.

27. A program product for frequency selective wireless transmission, the program product comprising:
   a non-transitory medium comprising instructions to be executed by a processor-based device, wherein the instructions, when executed by the processor-based device, perform operations, the operations comprising:
   receiving, by a first communications device, sounding packets wirelessly on a subset of sub-channels of a wide bandwidth channel during a beacon interval;
   determining, by the first communications device, a selected sub-channel from the subset of the sub-channels on which a sounding packet is received during the beacon interval; and
   communicating, by the first communications device, with a second communications device via the selected sub-channel, selection of the selected sub-channel for communication during the beacon interval, wherein the first communications device is configured to communicate exclusively via the selected sub-channel during the beacon interval after communication of the selection.

28. The program product of claim 27, wherein the operations further comprise:
   scanning sub-channels of the wide bandwidth channel to determine information about the sub-channels and transmitting the information about the sub-channels to the communications device.

29. The program product of claim 27, wherein the operations further comprise:
   receiving an intolerance bit from another communications device indicating that a sub-channel should not be used and not using the sub-channel for a time duration.

30. The program product of claim 27, wherein the operations further comprise:
   receiving an intolerance bit from another communications device indicating that a sub-channel should not be used and transmitting an indication of the intolerance bit to the communications device.

31. The apparatus of claim 22, wherein the apparatus further comprises logic to determine the selected channel based upon the channel condition of the selected sub-channel during receipt of the sounding packets.

32. The apparatus of claim 22, wherein the apparatus further comprises logic to determine the selected channel by selection of a 1 or 2 MHz sub-channel from a wider channel bandwidth that consists of a number of 1 or 2 MHz sub-channels and transmit packets on the selected sub-channel.

33. The apparatus of claim 7, wherein the logic to communicate with the receiving communication device is configured to communicate exclusively via the sub-channel in response to the selection during the beacon interval.

34. The apparatus of claim 7, wherein the apparatus further comprises logic to receive a second selection of a second sub-channel from the set of sub-channels from a second communications device and to communicate with the second communications device exclusively via the second sub-channel during the beacon interval.

* * * * *